US010384926B1

(12) United States Patent
Kaufman

(10) Patent No.: US 10,384,926 B1
(45) Date of Patent: Aug. 20, 2019

(54) INTEGRAL FUEL AND HEAT SINK REFRIGERANT SYNTHESIS FOR PRIME MOVERS AND LIQUEFIERS

(71) Applicant: Jay Stephen Kaufman, Kingston, NH (US)

(72) Inventor: Jay Stephen Kaufman, Kingston, NH (US)

( * ) Notice: Subject to any disclaimer, the term of this patent is extended or adjusted under 35 U.S.C. 154(b) by 0 days.

(21) Appl. No.: 16/024,895

(22) Filed: Jul. 1, 2018

(51) Int. Cl.
| | |
|---|---|
| *B67D 7/04* | (2010.01) |
| *F02C 3/28* | (2006.01) |
| *F02C 3/34* | (2006.01) |
| *F17C 5/02* | (2006.01) |
| *F02C 7/10* | (2006.01) |
| *F02C 6/14* | (2006.01) |
| *F25J 1/00* | (2006.01) |

(52) U.S. Cl.
CPC ............. *B67D 7/0498* (2013.01); *F02C 3/28* (2013.01); *F02C 3/34* (2013.01); *F02C 6/14* (2013.01); *F02C 7/10* (2013.01); *F17C 5/02* (2013.01); *F17C 2221/031* (2013.01); *F17C 2221/033* (2013.01); *F17C 2270/0581* (2013.01); *F25J 1/0012* (2013.01); *F25J 1/0022* (2013.01); *F25J 2260/60* (2013.01)

(58) Field of Classification Search
CPC ...... F02C 3/34; F02C 6/14; F02C 7/10; F02C 3/28; B67D 7/0498; F17C 5/02; F17C 2221/031; F17C 2270/0581; F17C 2221/033; F25J 2260/60; F25J 1/0012; F25J 1/0022
See application file for complete search history.

(56) References Cited

U.S. PATENT DOCUMENTS

| | | | | |
|---|---|---|---|---|
| 4,329,842 A | * | 5/1982 | Hoskinson | F02C 3/00 60/39.465 |
| 4,995,234 A | * | 2/1991 | Kooy | F01K 25/10 60/648 |
| 2010/0319354 A1 | * | 12/2010 | Guidati | F01K 23/10 60/772 |
| 2011/0132429 A1 | * | 6/2011 | Kaufman | F24V 30/00 136/246 |
| 2013/0139543 A1 | * | 6/2013 | Baxter | F25J 3/067 62/611 |
| 2013/0186095 A1 | * | 7/2013 | KauFman | F02C 1/04 60/772 |
| 2016/0102612 A1 | * | 4/2016 | Kaufman | F02C 3/34 60/39.49 |

* cited by examiner

*Primary Examiner* — Ted Kim
(74) *Attorney, Agent, or Firm* — Michael Persson; Catherine Napjus; Lawson Persson & Christian PC

(57) ABSTRACT

A system for renewable energy storage, providing integral synthesis of heat source cryo-fuel and heat sink refrigerant for distributed electric generation and motor vehicle prime movers and refrigerant liquefiers. Fuel synthesis is by gasification and anaerobic digestion of organic feedstock with heat recovery to drive thermo-chemical reactor and air and fuel liquefiers.

27 Claims, 4 Drawing Sheets

US 10,384,926 B1

INTEGRAL FUEL AND HEAT SINK REFRIGERANT SYNTHESIS FOR PRIME MOVERS AND LIQUEFIERS

FIELD OF THE INVENTION

The present invention relates to a system for renewable energy storage, and in particular to integral synthesis of heat source cryo-fuel and heat sink refrigerant for distributed generation and motor vehicle prime movers and liquefiers.

BACKGROUND

Since the 1970's a high efficiency prime mover with renewable energy storage has been a goal of motor vehicle and distributed electric generation design to provide energy independence, conserve fossil fuels, and reduce emission of combustion products. This has led to an increased need for clean and reliable energy storage devices, which can store the power generated from clean energy sources, and make it readily available when needed in a wide range of applications. As fossil fuels are consumed more rapidly than they can be produced, an "energy crisis" has emerged and there is a widely recognized need to develop new energy technologies. Moreover, the products of combustion are both unhealthy and dangerous for the environment, while the gradual increase in temperature of the earth's atmosphere, or "greenhouse effect", advises development of energy technology that minimizes the release of heat and greenhouse gases. Some examples of technologies that exploit natural "clean" energy sources include solar photo-voltaic panels, wind turbines, and geo-thermal systems. Other technologies, many focusing on motor vehicles, include recovery of vehicle deceleration and draft loss.

Energy storage of solar, wind and other intermittent sources has, in general, been dominated by batteries, which are resource intensive to manufacture, have limited number of charge cycles and may present a fire hazard. Other storage concepts under development are too expensive, hazardous or inefficient, including super capacitors, flywheels and compressed air. Renewable fuels are useful for extended unavailability of intermittent energy sources, but are in limited use, including compressed hydrogen, liquid natural gas, and bio-fuels. Hydrogen is produced inefficiently by electrolysis of water or steam reforming of methane from natural gas, which is available via the environmentally controversial fracking process. Because hydrogen is burned in inefficient converters, on-board vehicle storage is problematic and high pressures must be employed. While carbon from production of fuels may be captured for reuse or conversion to benign compounds, combustion of bio-fuels normally discharges carbon dioxide to the atmosphere.

Phase change of liquid air or nitrogen is considered to be a promising alternative storage means, finding application in electric generation and in motor vehicles. The liquid or solidified gas is referred to hereinafter as heat sink refrigerant produced by refrigerant condensation. A "liquid nitrogen economy" has been proposed [Kleppe, J. and Schneider, R, "*A Nitrogen Economy*", *ASEE,* 1974] and some high pressure engines with phase change storage using cryogenic compression have been tested. These include a fired turbine [Kishimoto, K. et-al, "*Development of Generator of Liquid Air Storage Energy System*", Mitsubishi Tech. Review Vol. 35-3, 1998] and two fuel-less reciprocating engines [Knowlen, C. et al, "*High Efficiency Energy Conversion Systems for Liquid Nitrogen Automobiles*", U. of Washington, SAE 981898, 1998] and [Ordonez, C. et al, "*Cryogenic Heat Engine for Powering Zero Emission Vehicles*", ASME Intl. Mech. Engineering Congress & Expo., 2001]. More recently, phase change storage is gaining acceptance in the United Kingdom as indicated by an operating 300 kW pilot plant and a fueless liquid nitrogen engine for compact urban vehicles [Center for Low Carbon Futures, "*Liquid Air in the Energy and Transport Systems*", ISBN:978-0-9575872-2-9, 2013]. In these prime movers, low compression work is attained by incompressible working fluid, which may include combustion air. Consumption of refrigerant is excessive in these high pressure engines (40 to 80 bar), which are not optimized for thermodynamic cycle or pressure ratio, nor supplemented by recovered energy. Improved engines have been proposed including a closed Brayton cycle with ambient source and quasi-isentropic cryo-compression sink [Ordonez, C., "*Liquid Nitrogen Fueled, Closed Brayton Cycle Cryogenic Heat Engine*", Energy Conversion & Management 41, 2000], and an open Brayton cycle with over ambient source and quasi-isothermal cryo-compression sink [Kaufman, J., "U.S. Pat. No. 7,854,278 B2", 2010]. These two cryogenic compression concepts would economize refrigerant consumption and profoundly impact design and production capacity of refrigerant condensation facilities.

Initial efforts to provide refrigerant are focused on available sources including low cost off-peak electric grid power and the heat of evaporation of liquid natural gas (lng), which is normally not recovered during distribution. While selection of these energy sources is based on availability and economics, inherent disadvantages include transmission loss, transport of the refrigerant and perpetuation of the environmental downside of centralized fossil fuel and nuclear use.

It is recognized that energy to drive refrigerant condensation must ultimately derive from renewable sources and be universally available for smaller scale distributed use in both stationary and motor vehicle application. As expected, there are also issues with the use of renewables, primarily unavailability of solar, wind and geo-thermal, and inefficiency of energy conversion components in all recovery processes. It is important to minimize refrigerant consumption, especially in motor vehicle use. Towards this end, captured vehicle energy will reduce refrigerant as well as fuel consumption. Vehicle energy recovery modes of solar, deceleration and draft loss also have issues. Solar recovery is limited by available capture area. Deceleration recovery is a developed technology, but limited by inherent compression braking with reciprocating engines. Capture of vehicle draft loss [Kaufman, J., "U.S. Pat. No. 7,854,278 B2", 2010] can be substantial at highway speeds, but is limited as for stationary wind, described above.

Following is a description of prior art components for phase change storage for providing refrigerant to cryo-compression engines:

Refrigerant condensers may liquefy or solidify a gas in special applications by transfer of heat to a lower temperature sink, as for example a vapor discharge sink for use during distribution of lng. More commonly, however, condensation is by various vapor-compression cycles. Gas is expanded by venting into a chamber while expansion causes a temperature drop and the pressurized gas entering the expander is further cooled by counter-flow heat exchange to the vented portion of expanded gas. Heat of compression in these machines is removed by cooling to ambient in an attached heat exchanger. Large central vapor-compression liquefiers are attaining efficiency of about 50%, however this requires complex expensive equipment with features such as pre-cooling and multiple expansion of refrigerant. To attain high efficiency in smaller applications other condensation concepts are under development. These include magnetic refrigeration, [Matsumoto, K. et al, "*Magnetic Refrigerator for Hydrogen Liquefaction*, J. of Physics: Conf. Series 150, 2009, and thermo-acoustic refrigeration [Wollan, J. et al, "*Development of a Thermoacoustic Natural Gas Liquefier*", Los Alamos Natl. Lab., LA-UR-02-1623, AlChE, 2002].

Several renewable energy compressor drives for vapor-compression liquefiers have been proposed for stationary application, including solar, wind and fuel fired. On-board motor vehicle refrigerant condensation is considered to be impractical due to low condensing efficiency and limited storage capacity.

Photo-voltaic panels convert light to electricity using a semi-conducting material such as silicon that exhibits the photo-voltaic effect. Natural convection cooling limits performance degradation of the cells. Performance increases from about 20 to 40% with concentrated radiation by mirror or lens, however, a forced circulation system is required to limit temperature rise. Other disadvantages include the economics of advanced cell technology including photo-voltaic material, complexity of concentrating, tracking and multi-junction/material systems, and losses due to battery charge/discharge and fouling of panel surfaces. Solar thermal systems require complex engine driven systems and performance is limited to an efficiency of about 20% due to low heat source temperature.

While free wind may be insufficient in most locations to provide viable liquefier drive, amplification of wind due to the presence of structures offers distributed energy recovery potential. Building amplified wind [Kaufman, J., "U.S. Pat. No. 9,395,118", 2016] operates by a self aspirating mechanism, in which wind impacting a structure suctions a smaller recovery flow through a turbine-generator. Output of this mechanism is limited by flow through the recovery turbine, estimated at 25% of impact flow.

Finally, refrigerant liquefiers may be driven by renewable fuel fired combustion engines. In addition to low engine efficiency, issues associated with state-of-art fuels to drive refrigerant condensation include high pressure requirement for on-board storage of gaseous fuel, cost of fuel liquefaction and carbon capture during fuel synthesis and combustion. Hydrogen is an exception, as it burns without carbon release, however, it has containment issues including, corrosiveness, high reactivity, gas storage pressure and liquefaction cost.

SUMMARY OF THE INVENTION

The object of the present invention is to provide local and highway liquid fuel and heat sink refrigerant stations for phase change energy storage by motor vehicle and distributed generation prime movers. Phase change storage minimizes energy required for refrigerant condensation while reducing fuel consumption and emissions. Further objects and advantages of the present invention are to:

provide integral heat source fuel and sink refrigerant synthesis by gasifiers, thermo-chemical reactors and anaerobic digesters for prime mover supply in a network of motor vehicle and distributed and off-grid electric generation;

provide transfer of prime mover heat source fuel and heat sink refrigerant and transfer of liquefier heat sink refrigerant between prime movers, liquefiers and associated gasifiers, thermo-chemical reactors and anaerobic digesters;

provide liquefied gasifier syngas with nitrogen as prime mover heat source fuel and as prime mover and air liquefier heat sink refrigerant;

provide thermo-chemical reactor hydrogen for conversion to methane for recycling carbon dioxide and for enriching syngas, as required;

provide liquefied thermo-chemical reactor oxygen as prime mover heat sink refrigerant and to support combustion of gasifier feedstock;

provide liquefied digester bio-methane as prime mover heat source fuel and air liquefier heat sink refrigerant;

provide digester dry ice as liquefier and photo-voltaic panel heat sink refrigerant;

provide recovered gasifier heat to drive a thermo-chemical reactor for hydrogen production;

provide recovered gasifier heat to drive liquefiers for production of liquefied gases, and provide compressed air from an air liquefier to an air blown gasifier to reduce air compression work to the gasifier.

The preferred embodiment is based on production of carbon neutral organic methane, syngas (hydrogen, carbon monoxide), and bio-gas (methane, carbon dioxide), which does not add to greenhouse gas emissions. Production utilizes anaerobic digestion and gasification of bio-degradable material. Therefore, it is an aspect of this invention to provide an improved system and method for producing alternative fuels as compared to fossil fuels.

It is a further aspect of this invention to provide an improved system and method for reducing waste heat in liquid or solidified heat sink refrigerant production.

It is a still further aspect of this invention to provide an improved system and method for reducing waste heat in solar energy capture systems.

These aspects of the invention are not meant to be exclusive and other features, aspects, and advantages of the present invention will be readily apparent to those of ordinary skill in the art when read in conjunction with the following description, accompanying figures and claims.

DETAILED DESCRIPTION

As a preface, it should be noted that all physical system components are referred to with an even reference number and all fluid compounds that move amongst the physical components are referred to with an odd reference number. Regardless of reference number, features with the same name are substantially the same features throughout the Figures. In addition, similar features that include reference numbers in some but not all Figures should be considered to be substantially similar features. Dashed lines illustrate electric connection between controllable generators, motors, compressors and valves. Finally, it is noted that when a specific model or distributor of a system component is included, this inclusion is merely exemplary and comparable components may be substituted.

Figure 1:
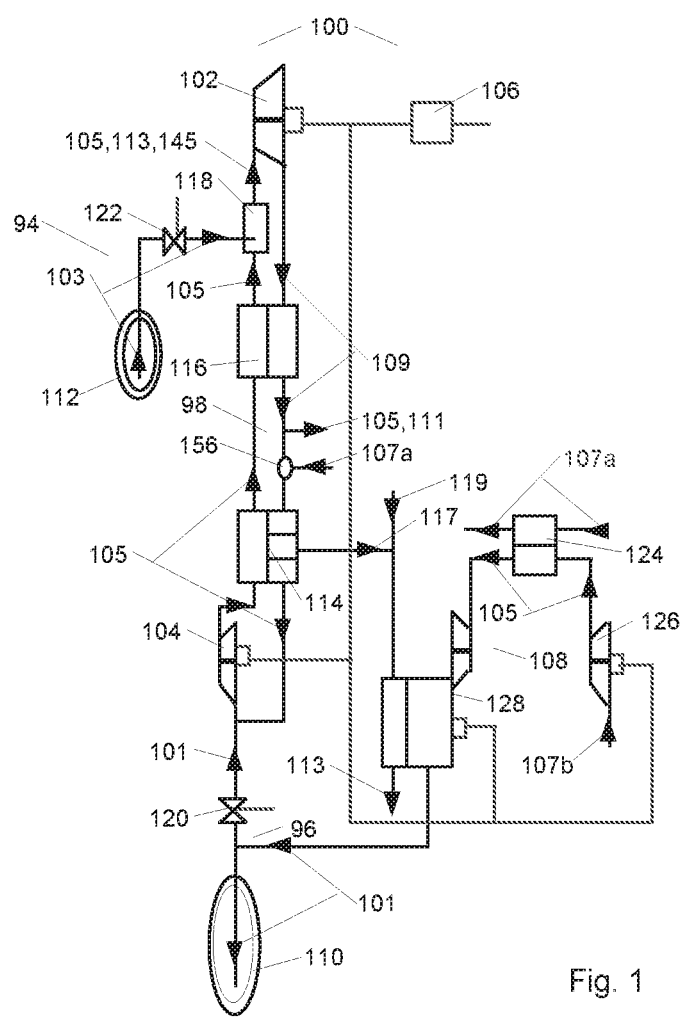
FIG. 1 is a schematic illustrating a preferred embodiment of a motor vehicle gas turbine prime mover of the present invention with methane fired heat source, liquid air heat sink and an air liquefier.

Referring first to FIG. 1, a schematic illustrating a preferred embodiment of a motor vehicle propulsion system 100 of the present invention is provided. Although the preferred use of system 100 is to propel a motor vehicle, one of ordinary skill in the art will recognize that it may be used to propel many types of vehicles. System 100 includes core gas turbine (GT) system 98, liquid air unit 96, liquid methane unit 94, air liquefaction system 108, and hybrid electric drive 106. The various components of system 100 are sometimes codependent. GT-generator 102 of core GT-system 98, for example, supplies electric power to at least one hybrid electric drive 106 with vehicle deceleration recovery. Similarly, on-vehicle air liquefaction system 108 provides liquid air 101 for absorption of compression heat from compressor 104 of core GT system 98. Core GT system 98 includes combustor 118, GT-generator 102, over-ambient recuperator 116, sub-ambient recuperator 114, and GT-compressor 104. As will be seen, a version of core GT system 98 is also included in the embodiments disclosed below with relation to FIGS. 3 and 4. Liquid methane unit 94 includes liquid methane dewar 112, liquid methane valve 122, and liquid methane 103. Liquid air unit 96 includes liquid air dewar 110, liquid air valve 120, and liquid air 101. Air liquefaction system 108 includes vehicle draft cooler 124, air liquefaction compressor 126, and magnetic liquefier 128.

Recuperators 114, 116 are heat exchangers. Heat is recovered from the atmospheric flow path to the compressed flow path through the recuperators. The over-ambient recuperator 116 recovers exhaust heat to the over-ambient compressed flow. The sub-ambient recuperator 114 recovers heat of intake air to the sub-ambient compressed flow. The sub-ambient recuperator 114 is an innovation that utilizes liquid air to provide sub-ambient cooling, which reduces compression work due to the increased density of the colder flow. With a sub-ambient recuperator, compression work is reduced from about 55% of GT output to 15%. Accordingly, fuel consumption is reduced by over 300%. The challenge is then to find renewable energy means to efficiently liquefy air. The present invention does this by utilizing fuel synthesis energy from an organic (non-wood) fueled anaerobic digester and from a wood fueled gasifier. In the former, dry ice provides pre-cooling of an air liquefier and of a photovoltaic panel. In the latter, gasifier (air or oxygen blown) pressure reduces air liquefier work input.

Liquid methane 103 is provided to combustor 118 from liquid methane dewar 112 via liquid methane valve 122, which controls the flow of methane 103. Liquid methane 103 may be transferred to methane dewar 112 from external sources, such as those described with reference to FIGS. 2-4 below. GT-generator 102 is fueled by methane in combustor 118 with air 105 from the pressure side of over-ambient recuperator 116 to support combustion. Exhaust 109 from GT-generator 102, containing steam 145, carbon dioxide 113, and air 105, flows into the over-ambient recuperator 116 and water condensate 111 is discharged therefrom after most of its exhaust heat is transferred within recuperator 116, as described above. Make-up air 107a is introduced into core GT system 98 between over-ambient recuperator 116 and sub-ambient recuperator 114 at air port 156. Atmospheric make-up air 107a (referred to as "first atmospheric air" in the claims) flows into sub-ambient recuperator 114 and is regeneratively cooled there. Sub-ambient recuperator 114 produces dry ice 117 through deposition, which may be provided to air liquefaction system 108, as described below, or captured for reprocessing, as required. In addition to dry ice 117, "circulating air" 105, which, as used herein, is a mixture of atmospheric make-up air 107a, liquid air 101, and exhaust 109, flows out of sub-ambient recuperator 114 and is pressurized by GT-compressor 104 and cooled by liquid air 101 from liquid air dewar 110 via liquid air valve 120, which controls the flow of liquid air 101. Liquid air 101 from dewar 110 is oxygen enriched due to the difference in boiling point between the nitrogen and oxygen components, while remaining air in dewar 110 is nitrogen enriched. Circulating air 105 continues back through the pressurized sides of sub-ambient recuperator 114 and over-ambient recuperator 116 and on to combustor 118.

Air liquefaction system 108 includes vehicle draft cooler 124, air liquefaction compressor 126, and magnetic liquefier 128. Atmospheric intake air 107b (referred to as "second air" in the claims) is cooled in vehicle draft cooler 124 and then compressed by an air liquefaction compressor 126. It is noted that air 107a discussed with respect to core GT system 98 above and air 107b discussed here are both ambient air around system 100, but as air 107a and 107b enter system 100 through different channels, they have been labeled slightly differently in FIG. 1, and are referred to as first and second air in the claims. Compressor 126 is powered by electric drive 106, which in turn is powered by GT-generator 102, as discussed above. Expansion magnetic liquefier 128 then provides air liquefaction by sensible cooling of turbine expansion followed by magneto-caloric absorption of latent heat. Dry ice 117 from recuperator 114 of core GT system 98 is provided to air liquefier 128. Liquid air 101, produced by air liquefier 128 continues to dewar 110 and sublimated carbon dioxide continues for processing. Magnetic liquefier 128 is preferred in small scale motor vehicle applications, as it effectively utilizes air pressure for liquefaction because the pressure is released without recirculation. A vapor compression liquefier, in vehicle size range, would have excessive energy loss, and is therefore not preferred over magnetic liquefier 128.

As shown in FIG. 1, a regenerative methane fired gas turbine-generator exemplifies design point performance of a prime mover for motor vehicle application. Heat sink energy is stored in liquid air from a vehicle deceleration driven liquefier, which may be supplemented by imported liquefied air. Storage density with fuel plus liquid air in the "source plus sink storage" system is about 16 times as for a Li-ion battery. The liquid air sink operates at the liquid phase temperature of −173° C. (−280° F.). A gas turbine is selected as the base line engine for "source plus sink storage" because of the simplification afforded by external compression, while replacing compression braking in hybrid vehicle application. The sink cools cryo-compressor intake air, reducing gas turbine compression work as with ambient intake, by about two-thirds.

The design point is assumed for a 1600 kg (3500 lb) compact hybrid car with drag coefficient of 0.29, frontal area of 2.2 m$^2$ (24 ft$^2$), requiring 8 kW (10.7 HP) to overcome wind and rolling resistance. Gas turbine efficiency is 50% at 50,000 rpm with turbine compression ratio of 1.3; turbine inlet gas temperature of 825° C. (1515° F.); air compressor inlet temperature of −173° C. (−280° F.); and heat exchanger effectiveness of 90%. Under these conditions fuel consumption is 0.8 kg/hr (1.8 lb/hr) and liquid air consumption is 16 kg/hr (35 lb/hr). Approximately 2.2 kg/day (5.0 lb/day) of exhaust carbon dioxide is deposed to dry ice by the evaporating air and extracted for supplementary cooling of the on-vehicle liquefier. Gasoline equivalent fuel consumption is estimated at 61 km/L (145 mpg). For comparison, a typical reciprocating engine in the same application has a cycle efficiency of 18% at 5,000 rpm and compression ratio of 10.

Assumed deceleration recovery of the hybrid transmission is 33% at 80 km/hr (50 mph). Thus, the liquefier will deliver 8 kg/day (17.5 lb/day) of liquid air, requiring import of an equal quantity to meet the average daily requirement.

A small [e.g., 28 kWe (21 HP) peak] recuperated gas turbine, which can be modified to incorporate cryogenic compression features of the present invention, is available from the Capstone Corporation of Chatsworth, Calif. A small magneto-caloric liquefier is available from Cooltech Applications of Strasbourg, France.

Figure 2:
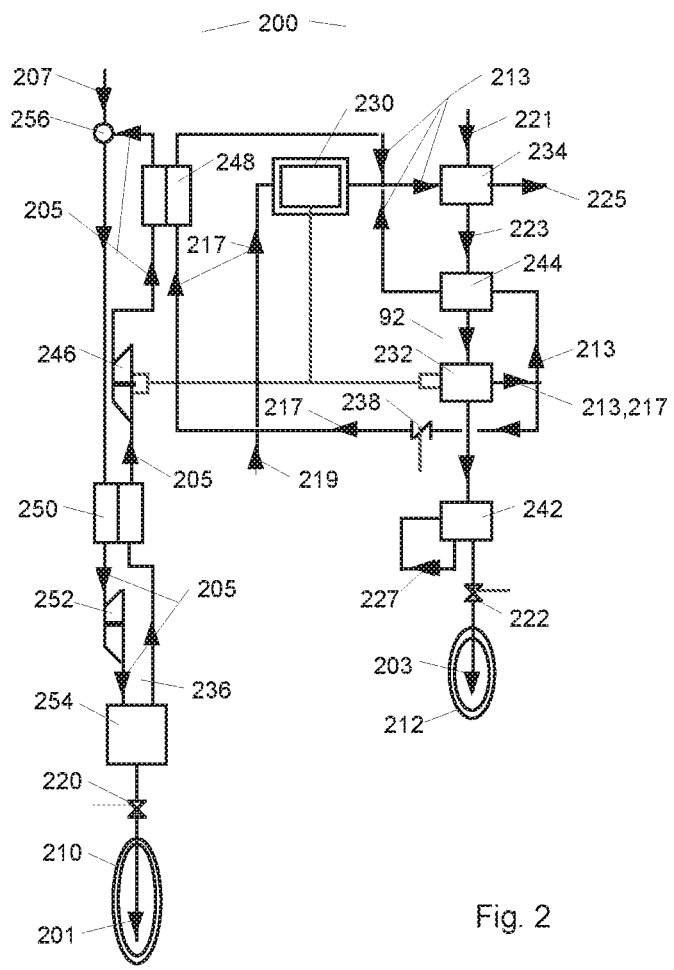
FIG. 2 is a schematic illustrating a preferred embodiment of an electric driven fuel and air liquefaction system of the present invention for providing heat sink coolant and liquid cryo-fuel.
Figure 3:
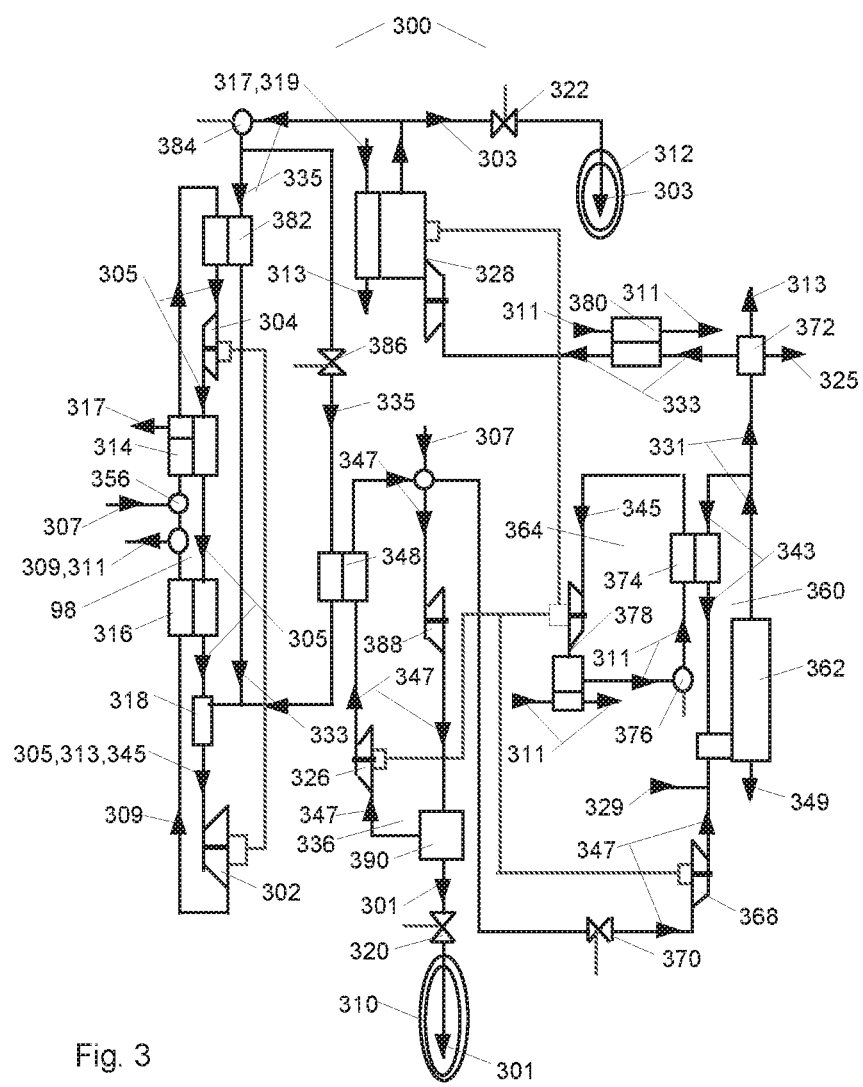
FIG. 3 is a schematic illustrating a preferred embodiment of an integrated gas turbine combined cycle off-grid generating station of the present invention with cogenerated heat sink coolant and liquid cryo-fuel due to pressure of an air blown fuel gasifier.
Figure 4:
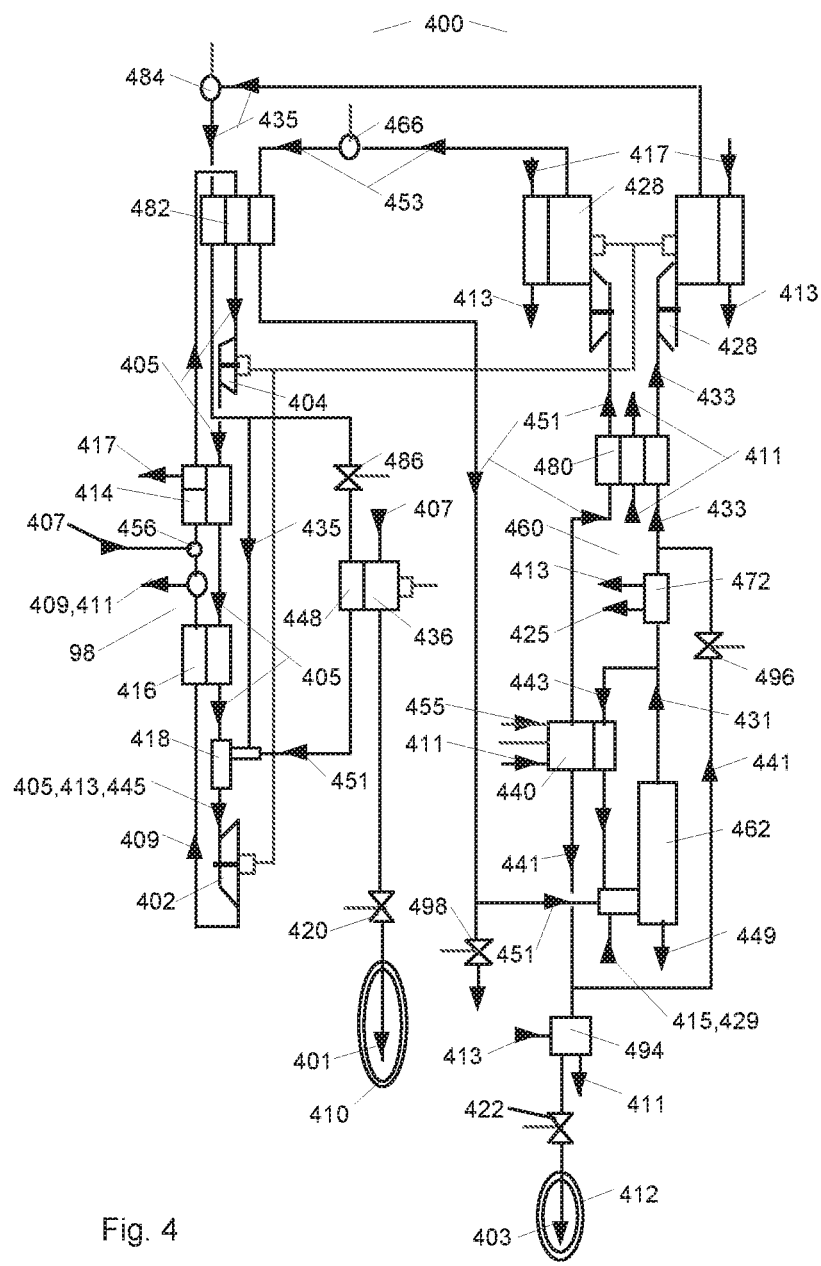
FIG. 4 is a schematic illustrating a preferred embodiment of an integrated gas turbine combined cycle generating station of the present invention with cogenerated heat sink coolant and liquid cryo-fuel, due to pressure of an oxygen blown fuel gasifier and a thermo-chemical reactor.

The following FIGS. 2-4 illustrate exemplary parts of a system for providing a liquid cryo-fuel heat source, as well as a sub-ambient heat sink refrigerant. In FIG. 2, a local anaerobic digester delivers bio-gas. Final products of the digester are dry ice and condensed methane, which are supplied for air liquefier sub-cooling and for prime mover heat source and sink. A recently proposed bio-mass cryo-condensing system (Nachtmann, K. et-al, "Dry Ice and Liquefied Biomethane—etc.", Modern Agricultural Sci. & Tech., 2015) is selected to deliver liquid methane and dry ice. In FIG. 3, a station gasifier delivers synthetic gas (syngas), which is supplied for air liquefier sub-cooling and for prime mover heat source and sink. In FIG. 4, a combined station gasifier and thermo-chemical reactor delivers syngas, hydrogen, and oxygen, which are supplied for air liquefier sub-cooling and for prime mover heat source and sink, while a portion of the hydrogen is chemically converted to liquid methane for motor vehicle use. Dashed lines illustrate electric connection between controllable generators, motors, compressors, and valves.

Referring now to FIG. 2, a schematic illustrating a preferred embodiment of a bio-gas condensation and air liquefaction system 200 for local application in a distributed generation network, is described. System 200 produces liquid methane 203 and liquid air 201 for compression cooling of GT-generator 102 (as shown in FIG. 1) and dry ice for cooling components of system 200. System 200 includes vapor-compression air liquefier 236, photo-voltaic panel 230, and digestion unit 92. Vapor-compression air liquefier 236 includes sub-cooler 248, liquefier compressor 246, chiller 250, air expander 252, separator 254, liquid air valve 220, and liquid air dewar 210. Digestion unit 92 includes anaerobic digester 234, bio-gas pre-cooler 244, bio-gas condenser 232, heat exchanger 242, methane valve 222, and methane dewar 212.

A photo-voltaic panel 230 provides electric output, while powering bio-gas condenser 232 fed bio-gas from anaerobic digester 234, and powering the liquefier compressor 246 of vapor-compression air liquefier 236. Dry ice 217 from condenser 232 and supplemental dry ice 219 from external sources provide heat sink cooling of panel 230, as well as pre-cooling of liquefier 236 via a dry ice valve 238.

Digester 234 converts organic feedstock 221 to product bio-gas 223, while discharging impurities 225. Feedstock 221 is non-wood organic material, such as leaves and grass. The bio-gas, a typical mixture of 30% methane and 70% carbon dioxide by weight, is condensed to product liquid methane 203 and dry ice 217 in condenser 232. The liquid methane 203 is drawn off to dewar 212 via a methane valve 222 and the dry ice 217 is circulated for cooling. Condenser 232 operates by circulation of methane gas 227, which cools the carbon dioxide portion to dry ice 217 and separates it in a separating heat exchanger 242, while a portion of separated carbon dioxide 213 pre-cools the entering bio-gas in a bio-gas pre-cooler 244. Condenser 232 may be the bio-mass cryo-condensing system proposed by Nachtmann, as disclosed above. The liquid methane 203 is discharged to dewar 212 for motor vehicle and other use.

Air liquefier 236 is a vapor-compression machine, in which circulating air 205 from a liquefier compressor 246 is pre-cooled by dry ice 217 in an air sub-cooler 248. The circulating air 205 entering the compressor 246 is also cooled by circulating air 205 coming from a liquid air separator 254, where it is sub-cooled before re-entering compressor 205 via air chiller 250, as discussed below. Air 205 then discharges through an air expander 252 that liquefies the cooled air 205 through expansion cooling to enter separator 254. Air expander 252 is a two-phase turbine expander designed to handle cavitating flow. A liquid product portion 201 is drawn off from separator 254 to an air dewar 210 via a liquid air valve 220. The non-liquid air portion 205 from separator 254 sub-cools air 205 before re-entering compressor 246. Pressurized make-up atmospheric intake air 207 is introduced to liquefier 236 through an air port 256 and combines with air 205 to enter expander 252.

As shown in FIG. 2, distributed generation with supplementary solar electric exemplifies prime mover design point performance for a local electric, liquid air and fuel cogeneration system. Heat sink energy, stored in dry ice, provides improved performance of the air liquefier and photo-voltaic panel. The dry ice sink, which may be supplemented from external sources, sublimates at the solid phase temperature of −79° C. (−110° F.). In addition, recirculation of carbon dioxide through the anaerobic digester, nearly doubles methane content of the bio-gas by conversion of approximately three parts carbon dioxide to one part methane. Accordingly, carbon release from prime movers of the present invention is projected at one-third as for state-of-art, due to reduced fuel consumption and to digester conversion.

The design point is assumed for 40 kWh capacity, equally divided between input from the local grid and the photo-voltaic panel.

Performance of the air liquefaction circuit operating in conjunction with the bio-gas separation and condensation circuit of the on-grid station is further exemplified. The example assumes that liquid air and fuel output is sufficient to supply one motor vehicle and to provide 32 kWh/day on-site power.

Operation of the air liquefaction circuit is described as follows:

1. Quasi-isentropic compression of circulating air to −65° C. (−85° F.) at 1.5 MPa (15 atm);
2. Pre-cooling of circulating air to −160° C. (−255° F.) in the air sub-cooler by sublimating dry ice recirculating to the digester;
3. Cooling of combined circulating air and make-up air in the air chiller by return of circulating air entering the liquefier compressor;
4. Expansion cooling of combined circulating air and make-up air through the expander to form liquid air at −190° C. (−310° F.) in the liquefier separator and;
5. Discharge of liquid air to the dewar while the recirculating vapor portion enters the air chiller.

The station air liquefier delivers up to 13.6 kg/day (30 lb/day) with estimated work input of 1750 kJ/kg (750 Btu/lb) of liquid air, about one-half as compared to an air liquefier without pre-cooling.

Operation of the bio-gas condenser circuit is described as follows:

1. Pre-cooling of purified gas to −80° C. (−112° F.) in a bio-gas pre-cooler while sublimating 20% of product dry ice to atmosphere;

2. Separation of methane and carbon dioxide at −82° C. (−115° F.) in the dry ice separating recuperator, from which carbon dioxide is removed;

3. Liquefaction of methane at −150° C. (−238° F.) while a vapor portion recirculates to the dry ice separating recuperator to form dry ice. The snow like dry ice is extracted and stored while the remaining carbon dioxide vapor recirculates to cool a compressed portion combined with make-up carbon dioxide gas; and 4. Expansion of the cooled and compressed methane gas in the bio-gas condenser.

Cooling the photo-voltaic panel to −80° C. (−110° F.) with dry ice increases its conversion efficiency by an estimated 30% [Liebert, C. et-al, "Solar-Cell Performance at Low Temperatures & Simulated Solar Intensities", NASA 1969]. Accordingly, potential efficiency of the non-concentrating panels is estimated at 60%. Import of recovered dry ice deposed from stationary and motor vehicle prime movers will supplement dry ice disposed from the anaerobic digester. Estimated power required by the fuel and dry ice condenser is 2100 kJ/kg (900 Btu/lb) of liquid methane product.

A 5 m$^2$ (54 ft$^2$) non-concentrating fixed panel provides required liquid methane and dry ice for one day based on bio-gas with two parts carbon dioxide to one part methane, and solar insolation of 6.3 kWh/daym$^2$ (2000 Btu/dayft$^2$). Panel area must be increased to store fuel and dry ice, as required for overcast days.

Now referring to FIG. 3, a schematic illustrating a preferred embodiment of a local off-grid generating station 300 of the present invention is described. The station 300 includes a fuel synthesis system 360, a station air liquefier 336, and a core GT system 98 with GT-sink 382. Fuel synthesis system 360 includes air blown gasifier 362, air booster compressor 368, air valve 370, steam circuit 364, syngas separator 372, and fuel cooler 380, and expansion magnetic fuel liquefier 328. Air liquefier 336 includes air liquefier valve 386, air sub-cooler 348, air liquefier compressor 326, air expander 388, air separator 390, and air dewar 310. As in FIG. 1, core GT system 98 includes combustor 318, GT-generator 302, over-ambient recuperator 316, sub-ambient recuperator 314, and GT-compressor 304. GT-generator 302 powers GT-compressor 304. Although the main components of core GT system 98 are the same as in FIGS. 1, 3, and 4, one difference is that core GT system 98 in FIG. 1 is cooled by injection of liquid air, while core GT systems 98 in FIGS. 3 and 4 are cooled via a heat exchanger. Also as in FIG. 1, components of each of the sub-systems of generating station 300 (fuel synthesis system 360, liquefier 336, and core GT system 98) interact with one another, as will be demonstrated below.

Fuel synthesis system 360 of generating station 300 includes air blown gasifier 362, air booster compressor 368, air valve 370, steam circuit 364, syngas separator 372, and cooler 380. Injected air 347 is introduced to fuel synthesis system 360 through air valve 370 and passes through air booster compressor 368. Air booster compressor 368 reduces compression work for air delivery to the gasifier 362 by boosting air pressure from liquefier compressor 326. Booster compression ratio is approximately 4. This air 347 flows to gasifier 362, where it supports incomplete combustion of wood feedstock 329 and recirculating char 343. Feedstock 329 is thus converted into raw pressurized syngas 331. Slag 349 is discharged from the bottom of gasifier 362. Syngas separator 372 separates raw syngas 331 into refined syngas 333, carbon dioxide gas 313, and impurities 325. Carbon dioxide 313 and impurities 325 are discharged from separator 372. Refined syngas 333 is then cooled in water-fed fuel cooler 380. Cooled refined syngas 333 is then provided to expansion magnetic liquefier 328, while liquid methane 303, with a higher boiling point than carbon monoxide 337, is extracted via a methane valve 322 to a methane dewar 312 for vehicle use. Fuel synthesis system 360 is a means for producing fuel. A similar means for producing fuel will be disclosed with reference to FIG. 4.

Expansion magnetic liquefier 328 liquefies the carbon monoxide, methane, and nitrogen portions of refined syngas 333, (collectively the "non-hydrogen portion" of the syngas) while the hydrogen portion remains a gas dissolved within the liquid portions. The liquid methane 303 is drawn off to methane dewar 312. This liquefied form of refined syngas is mixture 335.

Liquefier 328 provides sensible cooling by turbine expansion followed by magneto-caloric absorption of latent heat. Liquefier 328 is pre-cooled by dry ice 317, which may be from bio-gas condensation and air liquefaction system 200, discussed in FIG. 2. Dry ice 317 may be supplemented by dry ice 319 from external sources. Liquefied syngas mixture 335 is then used to sub-cool circulating air 347 in sub-cooler 348, where the flow of liquefied syngas mixture 335 to sub-cooler 348 is controlled by air liquefier valve 386. A portion of liquefied syngas mixture 335 is also provided for heat sink cooling of GT-generator 302 prior to firing GT-generator 302, as discussed below.

Steam gas circuit 364 of fuel synthesis system 360 includes heat recovery steam generator 374, feed-pump 376, and a fuel synthesis turbine-generator 378. In circuit 364, heat from recirculating char 343 is transferred to raise steam 345 in a heat recovery steam generator 374. Generator 374 is fed water by a feed-pump 376 and discharges steam 345 through a condensing turbine-generator 378. Condensing turbine-generator 378 provides power to air liquefier compressor 326 of station air liquefier 336, as well as to other components of fuel synthesis system 360, such as feed-pump 376, valve 370, booster compressor 368, and magnetic liquefier 328, as required. Turbine 378 also supplies water to feed-pump 376.

Station air liquefier 336 of generating station 300 includes air liquefier valve 386, sub-cooler 348, air liquefier compressor 326, air expander 388, air separator 390, and air dewar 310. Station air liquefier 336 is a vapor-compression machine. Air liquefier compressor 326 compresses recirculating air 347. This compressed recirculating air 347 is combined with compressed atmospheric make-up air 307 and cooled in air sub-cooler 348 by a portion of mixture 335 under pressure of a syngas mixture pump 384 to fire combustor 318 of core GT system 98. Circulating air 395 discharges through an air expander 388 into a liquid air separator 390. A liquid air product portion 301 from separator 390 is drawn off to an air dewar 310.

As disclosed with reference to FIG. 1, core GT system 98 of generating station 300 includes combustor 318, GT-generator 302, over-ambient recuperator 316, sub-ambient recuperator 314, and GT-compressor 304, but unlike as in FIG. 1, it also includes GT-sink 382. As discussed above, liquefied syngas mixture 335 provides cooling of circulating air 305 in GT-sink 382. In system 100, shown in FIG. 1, liquid air 101 is mixed in with the working fluid and acts as a heat sink. In station 300, GT-sink 382 is liquid syngas, or more specifically, hardware, such as a compressor and chiller, filled with syngas. The syngas absorbs compressor heat of compression, but the lowest temperature of the GT-compressor 304 is somewhat higher than that of liquid syngas because of heat transfer to the syngas. The compression process is quasi-isentropic, so the quasi-isentropic cryo-compression sink described above may be used as GT-sink 382. Liquid syngas vaporizes while cooling GT-sink 382 and the sub-cooler 348 of air liquefier 336. The syngas vapor combines from these sources to fire GT-combustor 318. Make-up air 307, which is introduced into core GT system 98 through air port 356, with circulating air 305 in GT-sink 382 is also cooled in a sub-ambient recuperator 314 and pressurized by a GT-compressor 304. Air 305 continues through an over-ambient recuperator 316, a combustor 318, GT turbine-generator 302 and back through over-ambient recuperator 316, and then sub-ambient recuperator 314. Water condensate 311 and exhaust 309 are discharged from recuperator 316. Dry ice 317 is discharged from sub-ambient recuperator 314 and captured for export, for example to magnetic liquefier 328 of fuel synthesis system 360.

As shown in FIG. 3, a syngas fired gas turbine-generator exemplifies prime mover design point performance for a local off-grid turbine-electric generator with liquid air and fuel cogeneration. Cryo-syngas with liquid nitrogen from the wood gasifier via the expansion magnetic liquefier provides sub-cooled air in the GT-compressor and air liquefier to meet heat sink cooling requirements of approximately 5% and 15% of GT-turbine output for air liquefier and gas turbine compression work, respectively. Both the air liquefier and gas turbine heat sinks operate at the syngas vaporization temperature of about −193° C. (−316° F.), while dry ice pre-cools the magnetic liquefier to about −80° C. (−112° F.). Based on estimated air blown gasifier heat recovery of 50% and mass ratio of 35 carbon monoxide to 1 hydrogen, heating value of the syngas is 13160 kJ/kg (5660 Btu/lb). Combined liquefied syngas and nitrogen sink cooling potential is sufficient with nitrogen from feedstock entertainment.

Design point of the gas turbine-generator is assumed for 4 kW output. Gas turbine efficiency is 55% at 100,000 rpm with turbine compression ratio of 1.7; turbine inlet gas temperature of 894° C. (1640° F.); air compressor inlet temperature of −175° C. (−280° F.) and recuperator effectiveness of 90%. Under these conditions syngas consumption is 2.3 kg/hr (5.1 lb/hr). Gas turbine compression work is about one-third, as with ambient air intake. Power to the air liquefier from the gas turbine-generator is about one-third as with a similar air liquefier due to sub-cooling by liquid fuel. Power to the syngas liquefier from the steam turbine-generator is about one-fourth as with a similar liquefier due to upstream gasifier pressure and pre-cooling by dry ice.

Operation of the air blown wood gasifier at 3 MPa (30 atm) is described as follows:

1. During combustion stage, feedstock and recycled char are burned with essentially complete conversion of carbon to syngas at about 850° C. (1560° F.), while discharging molten slag, which is quenched;
2. In the final gasification stage, combustion gases provide heating of added feedstock before recirculating to the combustor at about 450° C. (840° F.), while volatile matter is extracted and residual char turns into syngas;
3. Formation of primarily liquid syngas mixture by cooling and expansion through the turbine of the expansion magnetic liquefier followed by magneto-caloric transfer of latent heat. In the magnetic liquefier, a controlled magnetic field applies cyclical magnetization-demagnetization cycles across a magneto-caloric alloy due to motion of a magneto-caloric wheel, driven by the condensing turbine-generator.
4. The syngas mixture divides and circulates, as required, to provide cooling of GT-compressor and air liquefier discharge air, while deposed dry ice from GT-generator exhaust pre-cools circulating syngas in the magnetic liquefier;
5. Liquid methane is simultaneously extracted from the magnetic liquefier.

Now referring to FIG. 4, a schematic illustrating an alternate preferred embodiment 400 of highway and distributed generating station 300 of the present invention is described. The station 400 includes a fuel synthesis system 460, thermo-chemical reactor 440, hydrogen converter 494, methane dewar 412, hydrogen valve 496, a station air liquefier 436, and a core GT system 98 with GT-sink 482. Fuel synthesis system 460 includes oxygen blown gasifier 462, liquid oxygen pump 466, compressor 468, syngas separator 472, and multi-refrigerant GT-sink 482. Station air liquefier 436 includes air liquefier valve 486, sub-cooler 448, air liquefier compressor, air expander, air separator, and air dewar 410. (For simplicity, some components of station air liquefier 436 are not shown, but it is understood that the remaining components of station air liquefier 436 are as shown in FIG. 3 and are connected to remaining components of station 400 in the same manner as is described with respect to FIG. 3). Station 400 may include a steam circuit similar to steam circuit 364, including heat recovery steam generator 374, feed-pump 376, and a fuel synthesis turbine-generator 378, and operating as described above with reference to FIG. 3. In embodiments of station 400 that include such a steam circuit, liquefier 436 may be powered by turbine-generator 378, just as generator 378 may power liquefier 336 in the embodiment shown in FIG. 3.

As in FIG. 3, core GT system 98 includes combustor 418, GT-generator 402, over-ambient recuperator 416, sub-ambient recuperator 414, GT-compressor 404, and GT-sink 482. Water condensate 411 and exhaust 409 are discharged from recuperator 416. Station 400 is very similar to station 300, but may or may not include steam circuit 364, as station 300 does; and station 400 produces hydrogen 441 and oxygen 451 with the addition of thermo-chemical reactor 440. Another difference is that, while station 300 produces methane 403 by liquefaction from syngas 433, station 400 produces methane 403 via chemical reaction in hydrogen converter 494 with the syngas methane component not considered. The two expansion magnetic liquefiers 428 are cooled by dry ice 417 that may be provided from a station GT, vehicle GT discharge, a digester, or other supplementation, preferably renewable energy driven. In this station 400, the expansion magnetic liquefiers 428 must be in parallel configuration in order to keep oxygen from reacting with syngas. Expansion magnetic liquefiers 428 discharge carbon dioxide 413.

Station 400 includes a fuel synthesis system 460 powered by a GT-generator 402. In system 400, air entrained wood feedstock 429, is converted to raw pressurized syngas 431 in an oxygen blown gasifier 462 and heat recovered from recirculated char 443 in conjunction with electric input drives an exemplary thermo-chemical reactor 440 to convert sulfuric acid 455 and water 411 to reactor oxygen 451 and reactor hydrogen 441. Refined syngas 433 is partially liquefied into a fuel mixture 435 including carbon monoxide, supplementary nitrogen 415, and dissolved hydrogen 441. Supplementary nitrogen 415 includes nitrogen for feedstock entertainment and for abatement of oxides of nitrogen. Reactor hydrogen 441 and carbon dioxide 413 is converted in a hydrogen converter 494 to liquid methane 403 for export, however a portion may bypass converter 494 via a hydrogen valve 496 to enrich syngas 433. The carbon dioxide 413 may be provided from discharge from syngas separator 472 or expansion magnetic liquefiers 428. Mixture 435 provides cooling of air liquefier 436 and heat sink cooling and firing of GT-generator 402. Reactor oxygen 451 supplements heat sink cooling of GT-generator 402 and supports combustion in gasifier 462, while excess oxygen 451 is discharged via an oxygen valve 498.

In gasifier 462, injected oxygen 451 from liquid oxygen pump 466 supports partial combustion of feedstock 429 and recirculated char 443, while slag 449 is discharged and carbon dioxide 413 and impurities 425 are discharged from a syngas separator 472. Nitrogen entrained feedstock 429 is injected into gasifier 462 by a pressurized feedstock supply (not shown). A water fed fuel-oxygen cooler 480 cools refined syngas 433 and oxygen 451 before expansion through two magnetic liquefiers 428 in parallel arrangement, which provide liquefaction of mixture 435 and oxygen 453, respectively. Like magnetic liquefier 328, shown in FIG. 3, the magnetic liquefier 428 that liquefies mixture 435 liquefies the non-hydrogen portion of mixture 435.

Station air liquefier 436 is a vapor-compression machine similar to liquefier 336 of FIG. 3, which is sub-cooled via an air sub-cooler 448 by a portion of mixture 435, while a liquid air product portion 401 is drawn off to an air dewar 410 through liquid air valve 420. The vaporized mixture 435 from GT-sink 482 continues through an air liquefier valve 486 and air sub-cooler 448 under pressure of a syngas mixture pump 484 to fire combustor 418. Circulating air 405. carbon dioxide 415, and steam 445 are discharged after combustor 418. Electric power to liquefier 436 may be from GT-generator 402 or alternate sources, such as turbine-generator 378 of FIG. 3 and photo-voltaic panel 230 of FIG. 2.

In GT-generator 402, make-up air 407 with circulating air 405 is regeneratively cooled, in turn, in multi-refrigerant GT-sink 482 by a portion of mixture 435 and in a sub-ambient recuperator 414 by circulating air 405 from a GT-compressor 404. Air 405 continues from recuperator 414, as described for the GT-generator of FIG. 3.

As described above, fuel cooler 480, syngas separator 472, oxygen blown gasifier 462, thermo-chemical reactor 440, and hydrogen converter 494 also comprise a means for producing fuel.

Operation of the highway distributed electric, liquid air and fuel cogeneration station of FIG. 4 is similar to the station of FIG. 3. Instead of recovered heat of the oxygen blown gasifier driving a steam turbine, heat recovered from an oxygen blown gasifier at 850° C. (1560° F.), drives a thermo-chemical reactor at 800° C. (1470° F.) in conjunction with an electrolysis step at 100° C. (212° F.) to convert sulfuric acid and water to oxygen and hydrogen. Reactor hydrogen may be diverted to enrich syngas or be converted to liquid methane for export. Reactor oxygen is then liquefied to supplement carbon monoxide and nitrogen cooling of the gas turbine and the air liquefier before return to support gasifier combustion. A syngas heating value of 13000 kJ/kg (5600 Btu/lb) is based on estimated oxygen blown gasifier carbon monoxide to hydrogen mass ratio of 35 and heat recovery of 33%. Heat sink cooling potential of liquefied reactor oxygen is based on 68% reactor efficiency and ideal heat of sulfuric acid water reaction of 119,000 kJ/kg (51000 Btu/lb). Combined liquefied syngas and oxygen sink cooling potential is sufficient with liquid nitrogen from oxides of nitrogen control and feedstock entrainment to meet heat sink cooling requirements of approximately 5% and 15% of GT-turbine output for air liquefier and gas turbine compression work, respectively. Reactor hydrogen, all or in part, may be combined with imported dry ice in the hydrogen converter to provide methane for export, or diverted to enrich syngas to the gas turbine. In the former case, nearly 100% of carbon dioxide to the converter is reprocessed. In the latter case, maximum heat of combustion of the syngas is approximately 23000 kJ/kg (10000 Btu/lb). Operating conditions of the gas turbine and air liquefier are approximately as described for the station of FIG. 3.

Operation of the oxygen blown wood gasifier at 6 MPa (60 atm) is described as follows:

1. During combustion stage, feedstock and recycled char are burned with essentially complete conversion of carbon to syngas at about 800° C. (1470° F.), while discharging molten slag, which is quenched;

2. In the final gasification stage, combustion gases provide heating of added feedstock before recirculating to the combustor at about 450° C. (840° F.), while volatile matter is extracted and residual char turns into syngas;

3. Formation of primarily liquid syngas mixture, containing 76% carbon monoxide, 8% carbon dioxide and 3% dissolved hydrogen, by sensible cooling and expansion through the turbine of the expansion magnetic liquefier followed by magneto-caloric transfer of latent heat. In the magnetic liquefier, a controlled magnetic field applies cyclical magnetization-demagnetization cycles across a magneto-caloric alloy due to motion of a magneto-caloric wheel, driven by the GT-generator.

4. The syngas mixture divides and circulates, as required, to provide cooling of GT-compressor and air liquefier discharge air, while deposed dry ice from GT-generator exhaust pre-cools circulating syngas in the magnetic liquefier;

5. Liquid methane, formed by methanation, is simultaneously extracted from the hydrogen converter while reprocessing carbon dioxide.

A gas turbine for local application is available from Capstone Corp. of Chatsworth, Ca. and a highway station size gas turbine is available from Solar Turbines of San Diego, Ca. Both of these can be modified to incorporate sub-ambient heat sink features of the present invention. Anaerobic digester and gasifier technologies are evolving, as represented by several hundred global suppliers. A home size anaerobic digester is available from Homebiogas of Los Angeles, Ca. Engineering for a commercially available highway station size gasifier is available from Gammel Engineering of Abensberg, Germany. A station size magliquefier from Cooltech Applications of Strasbourg, France is projected to be scaled-up from a small commercially available module prior to 2020. Thermo-chemical reactor technology is not commercially available, primarily due to difficulties with nuclear and concentrated solar heat source options. Research and development is strongly funded world-wide, and the present invention provides a promising heat source alternative.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. An energy system comprising integral heat source fuel and heat sink refrigerant synthesis, said system comprising:
   a combustor, wherein said combustor is fueled by a fuel;
   a GT-generator powered by combustion of the fuel by said combustor, wherein said GT-generator produces exhaust comprising exhaust heat;
   an over-ambient recuperator into which the exhaust flows, wherein said over-ambient recuperator transfers at least a portion of the exhaust heat and discharges the exhaust that has been cooled;
   an air port that allows atmospheric air to be introduced into said system;
   a sub-ambient recuperator into which the atmospheric air and at least a portion of the exhaust flows and is regeneratively cooled, wherein said sub-ambient recuperator produces dry ice;
   a GT-sink that further cools circulating air;
   a GT-compressor that pressurizes circulating air, wherein said GT-compressor is cooled by the circulating air from said GT-sink, wherein the circulating air that has been pressurized continues back through said sub-ambient recuperator, then said over-ambient recuperator, then said combustor;
   an air liquefier, comprising:
      an air liquefier valve that controls a flow of a liquefied syngas mixture entering said air liquefier;
      a sub-cooler that uses the liquefied syngas mixture that passed through said air liquefier valve to cool air;
      an air expander through which at least the air that has been cooled by said sub-cooler passes, wherein said air expander expands the air;
      an air separator that separates liquid air from products of the expansion of said air expander;
      a liquid air dewar that stores the liquid air separated by said air separator; and
      an air liquefier compressor that compresses remaining products of the expansion of said air expander; and
   means for producing fuel.

2. The system as claimed in claim 1, where said means for producing fuel comprises:
   an air booster compressor that boosts air pressure from said air liquefier compressor of said air liquefier;
   an air valve that controls a flow of the air from said air liquefier and provides the air to said air booster compressor;
   an air blown gasifier that receives the air from said air booster compressor and partially combusts feedstock and char, wherein the combustion converts the feedstock into pressurized syngas;
   a syngas separator that separates the syngas from said air blown gasifier into at least purified syngas;
   a fuel cooler that cools the purified pressurized syngas;
   a steam circuit, comprising:
      a feed-pump that supplies water;
      a steam generator that uses heat from the char combusted by said air blown gasifier to convert the water from said feed-pump into steam; and
      a fuel synthesis turbine-generator that is driven by the steam and provides power to at least said air liquefier compressor of said air liquefier;
   an expansion magnetic liquefier that receives the cooled pressurized syngas from said fuel cooler and liquefies a non-hydrogen portion of the syngas producing at least a liquid methane product and a liquefied syngas mixture;
   a liquid methane dewar that contains liquid methane; and
   a liquid methane valve that controls a flow of the liquid methane in and out of said liquid methane dewar, including in from said expansion magnetic liquefier.

3. The system as claimed in claim 2, wherein said fuel synthesis turbine-generator of said steam circuit of said means for producing fuel further provides power to at least one of said feed-pump of said steam circuit, said air valve, said air booster compressor, and said expansion magnetic liquefier.

4. The system as claimed in claim 2, wherein the liquefied syngas mixture is provided for coolant in turn to said GT-sink and to said air liquefier via said air liquefier valve.

5. The system as claimed in claim 2, wherein the char that is partially combusted by said air blown gasifier recirculates through at least said steam generator of said steam circuit.

6. The system as claimed in claim 2, wherein slag is discharged from said air blown gasifier.

7. The system as claimed in claim 2, wherein said syngas separator separates the syngas into purified syngas, carbon dioxide gas, and impurities and wherein said syngas separator discharges the carbon dioxide gas and impurities.

8. The system as claimed in claim 2, wherein water is discharged from said over-ambient recuperator.

9. The system as claimed in claim 8, wherein the water discharged from said over-ambient recuperator is provided to said fuel cooler of said means for producing fuel.

10. The system as claimed in claim 2, wherein said fuel cooler is supplied with water.

11. The system as claimed in claim 2, wherein said expansion magnetic liquefier is pre-cooled by dry ice.

12. The system as claimed in claim 2, wherein the dry ice produced by said sub-ambient recuperator is provided to said expansion magnetic liquefier of said means for producing fuel for cooling.

13. The system as claimed in claim 2, wherein the syngas mixture is the fuel that fuels said combustor.

14. The system as claimed in claim 2, further comprising a vehicle that receives liquid methane from said liquid methane dewar.

15. The system as claimed in claim 1, wherein said means for producing fuel comprises:
   an oxygen blown gasifier that partially combusts feedstock and char, wherein the combustion converts the feedstock into pressurized syngas;
   a syngas separator that separates the syngas from said oxygen blown gasifier into at least purified syngas and oxygen and discharges carbon dioxide;
   a fuel cooler that cools the purified pressurized syngas;
   a thermo-chemical reactor that is heated by char recirculating from said oxygen blown gasifier and that converts sulfuric acid and water into at least reactor oxygen and reactor hydrogen;
   a hydrogen converter that converts at least a portion of the reactor hydrogen and carbon dioxide discharged from at least said syngas separator into liquid methane;
   a liquid methane dewar that contains liquid methane and receives the liquid methane from said hydrogen converter; and
   a liquid methane valve that controls a flow of the liquid methane in and out of said liquid methane dewar, including in from said hydrogen converter.

16. The system as claimed in claim 15, further comprising at least two expansion magnetic liquefiers, wherein:
   a first expansion magnetic liquefier receives oxygen from said fuel cooler and liquefies the oxygen and the liquefied oxygen is provided to said GT-sink and said oxygen blown gasifier; and a second expansion magnetic liquefier receives syngas from said fuel cooler and liquefies a non-hydrogen portion of the syngas into a liquefied syngas mixture and the liquefied syngas mixture is provided to said GT-sink and to said sub-cooler via said air liquefier valve.

17. The system as claimed in claim 16, wherein said first and second expansion magnetic liquefiers discharge carbon dioxide and the carbon dioxide discharged from said first and second expansion magnetic liquefiers is provided to said hydrogen converter.

18. The system as claimed in claim 16, wherein the syngas mixture is the fuel that fuels said combustor.

19. The system as claimed in claim 15, further comprising a hydrogen valve that controls a flow of the reactor hydrogen from said thermo-chemical reactor, wherein a portion of the reactor hydrogen bypasses said hydrogen converter and travels through said hydrogen valve to enrich the purified syngas flowing between said syngas separator and said fuel cooler.

20. The system as claimed in claim 19, further comprising an oxygen valve, wherein excess oxygen is discharged from said system through said oxygen valve.

21. The system as claimed in claim 15, further comprising a photo-voltaic panel that provides power to at least said air liquefier compressor of said air liquefier.

22. The system as claimed in claim 15, further comprising a steam circuit comprising:
   a feed-pump that supplies water;
   a steam generator that uses heat from the char combusted by said oxygen blown gasifier to convert the water from said feed-pump into steam; and
   a fuel synthesis turbine-generator that is driven by the steam and provides power to at least said air liquefier compressor of said air liquefier.

23. The system as claimed in claim 15, further comprising a station that receives liquid methane from said liquid methane dewar.

24. The system as claimed in claim 1, further comprising a vehicle that receives liquid air from said liquid air dewar.

25. The system as claimed in claim 1, further comprising a station that receives liquid air from said liquid air dewar.

26. The system as claimed in claim 1, further comprising a station that receives dry ice from said sub-ambient recuperator.

27. The system as claimed in claim 1, further comprising a vehicle that receives dry ice from said sub-ambient recuperator.

* * * * *